United States Patent
Yang et al.

(10) Patent No.: US 9,856,149 B2
(45) Date of Patent: Jan. 2, 2018

(54) VANADIUM-TITANIUM COMPOUND MATERIAL WITH HIGH THERMAL STABILITY AND HIGH ACTIVITY AND PREPARATION METHOD THEREOF

(71) Applicants: NANJING TECH UNIVERSITY (CN), Nanjing (CN); CHANGSHU YUTYRONE ADVANCED WEAR MATERIALS TECHNOLOGY CO., LTD. (CN), Changshu (CN)

(72) Inventors: Zhuhong Yang, Nanjing (CN); Licheng Li, Nanjing (CN); Xiaohua Lu, Nanjing (CN); Wenjun Yao, Changshu (CN); Tuo Ji, Nanjing (CN); Zheng Li, Jiangsu (CN); Chang Liu, Nanjing (CN)

(73) Assignees: NANJING TECH UNIVERSITY, Nanjing (CN); CHANGSHU YUTYRONE ADVANCED WEAR MATERIALS TECHNOLOGY CO., LTD., Changshu (CN)

( * ) Notice: Subject to any disclaimer, the term of this patent is extended or adjusted under 35 U.S.C. 154(b) by 272 days.

(21) Appl. No.: 14/427,613

(22) PCT Filed: Sep. 29, 2012

(86) PCT No.: PCT/CN2012/082481
§ 371 (c)(1),
(2) Date: Mar. 11, 2015

(87) PCT Pub. No.: WO2014/047937
PCT Pub. Date: Apr. 3, 2014

(65) Prior Publication Data
US 2015/0246823 A1 Sep. 3, 2015

(51) Int. Cl.
*C01G 31/00* (2006.01)
*B01J 23/22* (2006.01)
(Continued)

(52) U.S. Cl.
CPC ............ *C01G 31/00* (2013.01); *B01J 21/063* (2013.01); *B01J 23/22* (2013.01); *B01J 35/002* (2013.01);
(Continued)

(58) Field of Classification Search
CPC ........ B01J 21/063; B01J 23/22; B01J 35/002; B01J 35/1009; B01J 35/1014;
(Continued)

(56) References Cited

U.S. PATENT DOCUMENTS 3,464,930 A * 9/1969 Goehre .................... B01J 23/22
502/309
3,562,185 A * 2/1971 Friedrichsen et al. ... B01J 21/06
502/242

(Continued)

FOREIGN PATENT DOCUMENTS

CN 1076925 A 10/1993
CN 1265383 A 9/2000
(Continued)

OTHER PUBLICATIONS

"TiO2(B)/anatase heterostructure nanofibers decorated with anatase nanoparticles as efficient photocatalysts for methanol oxidation," Tarek A. Kandiel et al. Journal Molecular Catalysis A: Chemical 425 (2016), pp. 55-60.*
(Continued)

*Primary Examiner* — Patricia L. Hailey
(74) *Attorney, Agent, or Firm* — Oliff PLC

(57) ABSTRACT

It discloses a vanadium-titanium compound material with high thermal stability and high activity and a preparation
(Continued)

method thereof. The vanadium-titanium compound material is mainly composed of vanadium oxide and titanium oxide, where the content of vanadium oxide is 0.5% to 30% by mass of the vanadium-titanium compound material, and the crystal form of titanium oxide in the vanadium-titanium compound material is one of anatase and $TiO_2(B)$ or a mixture thereof.

15 Claims, 4 Drawing Sheets

(51) Int. Cl.
*B01J 21/06* (2006.01)
*B01J 35/00* (2006.01)
*B01J 35/10* (2006.01)
*B01J 37/04* (2006.01)
*B01J 37/08* (2006.01)
*B01J 37/02* (2006.01)
*B01J 37/00* (2006.01)

(52) U.S. Cl.
CPC ....... *B01J 35/1009* (2013.01); *B01J 35/1014* (2013.01); *B01J 35/1019* (2013.01); *B01J 35/1038* (2013.01); *B01J 35/1042* (2013.01); *B01J 35/1057* (2013.01); *B01J 35/1061* (2013.01); *B01J 37/0203* (2013.01); *B01J 37/0236* (2013.01); *B01J 37/04* (2013.01); *B01J 37/088* (2013.01); B01J 37/0081 (2013.01); B01J 2523/00 (2013.01); C01P 2002/72 (2013.01); C01P 2006/12 (2013.01); C01P 2006/14 (2013.01); C01P 2006/16 (2013.01); C01P 2006/32 (2013.01)

(58) Field of Classification Search
CPC ................ B01J 35/1019; B01J 35/1038; B01J 35/1042; B01J 35/1057; B01J 35/1061; B01J 37/0203; B01J 37/0236; B01J 37/04; B01J 37/088; B01J 2523/47; B01J 2523/55; C01P 2006/12; C01P 2006/14; C01P 2006/16
USPC ............... 502/312, 350; 423/594.8, 598, 610
See application file for complete search history.

(56) References Cited

U.S. PATENT DOCUMENTS

| | | | | |
|---|---|---|---|---|
| 3,948,807 A | * | 4/1976 | Fuchigami | B01J 23/22 502/242 |
| 4,085,193 A | * | 4/1978 | Nakajima | B01D 53/9418 423/239.1 |
| 5,750,777 A | * | 5/1998 | Aubry | C07C 51/215 562/512.2 |
| 5,840,971 A | * | 11/1998 | Gubelmann-Bonneau | C07C 51/235 562/538 |
| 6,552,233 B2 | * | 4/2003 | Wachs | C07C 45/38 568/471 |
| 7,491,676 B2 | * | 2/2009 | Augustine | B01D 53/8628 502/302 |
| 2012/0149933 A1 | * | 6/2012 | Yamamoto | B01J 21/063 558/327 |

FOREIGN PATENT DOCUMENTS

| | | | | |
|---|---|---|---|---|
| CN | 101433835 A | | 5/2009 | |
| CN | 101480611 A | | 7/2009 | |
| CN | 102872854 A | | 1/2013 | |
| DE | 41 34 292 | * | 10/1992 | ............ B01J 23/22 |

OTHER PUBLICATIONS

"Physical and Chemical Characterization of Surface Vanadium Oxide Supported on Titania: Influence of Titania Phase (Anatase, Rutile, Brookite and B)," Goutam Deo et al. Applied Catalysis A, vol. 91, Issue 1 (Nov. 1992), pp. 27-42.*

"Effect of Additives on the Structure and Reactivity of the Surface Vanadium Oxide Phase in $V_2O_5$/$TiO_2$ Catalysts," G. Deo et al. Journal of Catalysis, vol. 146, Issue 2 (Apr. 1994), pp. 335-345.*

"Formation of highly crystallized $TiO_2(B)$ and its photocatalytic behavior," Ashok Kumar Chakraborty et al. Applied Catalysis B: Environmental 93 (2010), pp. 368-375.*

"Thermal influence on the structure and photocatalytic activity of mesoporous titania containing $TiO_2(B)$", Teruhisa Hongo et al. Microporous and Mesoporous Materials 142 (2011), pp. 316-321.*

"Synthesis, microstructure, and properties of black anatase and B phase $TiO_2$ nanoparticles," Lu Li et al. Materials and Design 100 (2016), pp. 235-240.*

* cited by examiner

VANADIUM-TITANIUM COMPOUND MATERIAL WITH HIGH THERMAL STABILITY AND HIGH ACTIVITY AND PREPARATION METHOD THEREOF

This application is the U.S. national phase of International Application No. PCT/CN2012/082481 filed on 29 Sep. 2012 which designated the U.S., the entire content of the International Application is hereby incorporated by reference.

TECHNICAL FIELD

The present invention belongs to the technical field of material preparation, and particularly relates to a vanadium-titanium compound material with high stability and high activity and a method for preparing the same.

RELATED ART

According to statistics, from 1967 to 2000, 28% of published papers about catalytic application of transition metals are vanadium-related, and 15% are titanium related, and a large number of reports indicate that among many catalytic reaction system, vanadium and titanium have attracted extensive attention[1]. Especially vanadium-titanium compounds have good prospects in environmental protection- and energy-related catalytic system such as selective catalytic reduction of oxynitrides, oxidation of volatile organic compounds, oxidation of hydrogen sulfide and, selective oxidation of hydrocarbons, compared with other materials.

The catalytic performance of a vanadium-titanium compound is closely associated with the structure of one component, that is, titanium oxide [2]. Titanium oxide in nature is classified into three conventional crystalline forms: anatase, brookite and rutile, where rutile is the stable phase of titanium oxide, and anatase and brookite are the metastable phase. In a high-temperature heat treatment process, anatase and brookite are finally converted into rutile. There are large differences in catalytic performance among titanium oxide of different crystal forms after being composed with vanadium oxide. Under normal circumstances, the performance of vanadium-titanium compound containing titanium oxide of metastable phase anatase is the best. However, during the preparation or application of material, the material always needs to face with high high-temperature environments, so crystal transformation easily occurs in titanium oxide in the vanadium-titanium compound, and rutile type titanium oxide is generated. Vanadium oxide is likely to form a solid solution with rutile type titanium oxide, so that the catalytic performance of the vanadium-titanium compound is significantly degraded[3]. Additionally, vanadium oxide will promote the crystal transformation of titanium oxide, resulting in that the generation temperature of rutile type titanium oxide in the vanadium-titanium compound is lower than that of conventional titanium oxide, thereby further increasing the degradation of the catalytic performance of the vanadium-titanium compound[4].

Presently, a large amount of work has been focused on how to solve the problem of poor stability of the vanadium-titanium compound so as to maintain the high performance. A common practice is introducing a structure auxiliary agent (such as tungsten, molybdenum, aluminum, silicon and potassium) to increase the generation temperature of rutile type titanium oxide[5]. Although the addition of the structure auxiliary agent can relieve the conversion of anatase type titanium oxide into rutile type titanium oxide to a certain degree, there are still a series of problems. For example, some structure auxiliary agents has great influence on the disperse state of vanadium oxide, easily resulting in significant decline of the catalytic performance of the vanadium-titanium compound; additionally, the amount of a vanadium-titanium compound useful in denitration, for example, tungsten oxide or molybdenum oxide, as the structure auxiliary agents, is always up to 8 to 10 times the amount of vanadium oxide in the compound, resulting in significant increase of the cost of the vanadium-titanium compound [6]. Therefore, how to improve the stability and maintain the good performance of the vanadium-titanium compound at the same time is still the focus of the industry.

SUMMARY

In order to solve the above problem, an objective of the present invention is to provide a vanadium-titanium compound material, where the material has good thermal stability and catalytic activity, when being used as a catalyst, the removal rate of oxynitride is up to 98%, the conversion rate of the volatile organic compound is 97% and more, and no structure auxiliary agent needs to be added in the preparation process.

Another objective of the present invention is to provide a method for preparing the vanadium-titanium compound material, where the method has the advantages of simple process, low cost, being suitable for large-scale industrial production.

The objectives of the present invention can be achieved through the following measures:

A vanadium-titanium compound material with high thermal stability and high activity is provided. The material is mainly composed of vanadium oxide and titanium oxide, where the content of vanadium oxide is 0.5% to 30% by mass of the vanadium-titanium compound material, the crystal form of titanium oxide in the vanadium-titanium compound material is one of anatase and $TiO_2(B)$ or a mixture thereof. Preferably, the content of vanadium oxide in the vanadium-titanium compound material is 1% to 10% by mass of the vanadium-titanium compound material, and most preferably, the content of vanadium oxide in the vanadium-titanium compound material is 1% to 5% by mass of the vanadium-titanium compound material.

The specific surface area of the vanadium-titanium compound material is 1 to 200 $m^2/g$, the pore volume is 0.005 to 0.8 $cm^3/g$, and preferably, the specific surface area of the vanadium-titanium compound material is 1 to 120 $m^2/g$, and the pore volume is 0.01 to 0.4 $cm^3/g$.

A method for preparing the vanadium-titanium compound material with high thermal stability and high activity is provided. The method includes: adding titanium oxide containing the crystal form $TiO_2(B)$ to a vanadium-containing precursor solution, fully stirring, standing still for 6 to 8 h, drying, and then roasting at 300° C. to 700° C. In titanium oxide containing the crystal form $TiO_2(B)$ of the present invention, a part of titanium oxide is in the crystal form $TiO_2(B)$ or all of titanium oxide is in the crystal form $TiO_2(B)$. Preferably, titanium oxide in the crystal form $TiO_2(B)$ accounts for 1% to 100% by mass of all titanium oxide, further preferably, titanium oxide in the crystal form $TiO_2(B)$ accounts for 5% to 100% by mass of all titanium oxide, and most preferably, titanium oxide in the crystal form $TiO_2(B)$ accounts for 5% by mass of all titanium oxide.

Titanium oxide containing the crystal form $TiO_2(B)$ has a specific surface area of 10 to 300 $m^2/g$, a pore volume of 0.02 to 10 $cm^3/g$, and an average pore size of 1.0 to 50 nm.

In the present invention, useful vanadium-containing precursor is metavanadate, vanadyl sulfate or vanadyl oxalate, and the metavanadate is preferably, ammonium metavanadate. The solvent for the vanadium-containing precursor solution is water or an organic alcohol, where the organic alcohol is preferably ethanol, and most preferably absolute ethanol. Preferably, the concentration of the vanadium-containing precursor solution is 1 to 6 mol/L.

The method may further includes: dissolving the vanadium-containing precursor and a cosolvent together in water or an organic alcohol solvent to prepare an impregnating solution, then adding the impregnating solution into titanium oxide containing the crystal form $TiO_2(B)$ and fully stirring, standing still for 6 to 8 h, drying and calcinating at 300° C. to 700° C. The ratio of the vanadium-containing precursor solution and titanium oxide containing the crystal form $TiO_2(B)$ is 0.5 to 1.0 mL/g, and preferably, is 0.7 mL/g.

Generally, titanium oxide has three crystal forms: anatase, rutile and brookite. $TiO_2(B)$ is a new crystal form of $TiO_2$ that is found later by Marchand et al for the first time in 1980. The structural parameters of the four crystal forms are shown in Table 1:

TABLE 1

Structural parameters of the crystal form $TiO_2$

| Crystal form | Space group | Density (g·cm$^3$) | Lattice parameter (nm) | Literature resources |
|---|---|---|---|---|
| rutile | P4$_2$/mnm | 4.13 | a = 0.459, c = 0.296 | |
| Anatase | I4$_1$/amd | 3.79 | a = 0.379, c = 0.951 | |
| Brookite | Pbca | 3.99 | a = 0.917, b = 0.546, c = 0.514 | |
| TiO$_2$(B) | I4/m | 3.64 | a = 1.216, b = 0.374, c = 0.651, β = 107.3° | Marchand (1980) |

By means of XRD or Raman spectroscopy detection, the crystal form of titanium oxide of the vanadium-titanium compound material of the present invention is determined to be one or two of anatase and $TiO_2(B)$.

Compared with the prior art, the present invention has the following beneficial effects:

(1) In the process of preparing the vanadium-titanium compound material of the present invention, no new structure auxiliary agent needs to be added to improve the thermal stability of titanium oxide in the vanadium-titanium compound material, the generation temperature of rutile type titanium oxide in the vanadium-titanium compound material may be 900° C. and more.

(2) The vanadium-titanium compound material of the present invention has excellent catalytic performance, and when being used as a catalyst, the conversion rate of oxynitride is 98% and more, which is superior to the existing industrial index; additionally, the conversion rate of the volatile organic compound is 97% and more.

(3) The method for preparing the vanadium-titanium compound material of the present invention is simple, has low costs, and is suitable for industrialized large-scale production.

BRIEF DESCRIPTION OF THE DRAWINGS

The disclosure will become more fully understood from the detailed description given herein below for illustration only, and thus are not limitative of the disclosure, and wherein:

As shown in FIG. 1 and FIG. 2, in the heat-treatment test at 500° C. to 800° C., the vanadium-titanium compound material prepared according to the present invention has no rutile phase and is pure anatase, and the sample has no rutile phase until the temperature is higher than 900° C.; while the vanadium-titanium compound material prepared by a conventional method has the rutile phase at 600° C.;

As shown in FIG. 3 and FIG. 4, the vanadium-titanium compound material prepared according to the present invention has reduction peaks after treatment at 500° C. to 1000° C., as for the vanadium-titanium compound material prepared according to the conventional method, the strength of the reduction peak at 600° C. is much weaker than that of the sample treated at 500° C., and the sample treated at 700° C. has no reduction peak, indicating that the vanadium-titanium compound material prepared according to the method of the present invention has excellent thermal stability.

DETAILED DESCRIPTION

The present invention is further described below according to embodiments, and the specific implementation solutions of the following embodiments are merely used to specifically illustrate the present invention, but the present invention is not limited to the disclosure of the embodiments.

Embodiment 1:

According to the method described in Patent No. ZL0315827.5, anatase type titanium oxide, industrial grade $K_2CO_3$ (purity 98 wt %) and $H_2O$ were fully mixed, where the $TiO_2/K_2O$ molar ratio was 1.9, and the water content was 20 wt %; the mixed reactants were uniformly coated on an alumina plate and sintered at a reaction temperature of 880° C. for a reaction time of 2 h, and the sintered product was potassium dititanate; the sintered product was dispersed in water and then placed in a solution of a 5 fold volume at 50° C. and pH 8, and reacted for 8 h, and after filtration, placed in a hydrochloric acid aqueous solution at pH 3 and stirred for 8 h, to a potassium content in solid of less than 0.5 wt % by mass of the product; the resulting products were washed with water, filtered and dried at 20° C. to 50° C. for 12 h to obtain the hydrated product; the hydrated product was crystallized in the air for 2 h at 500° C., to obtain titanium oxide containing the crystal form $TiO_2(B)$, where titanium oxide contained 95% anatase crystal form and 5% $TiO_2(B)$ crystal form, and had a specific surface area of 105 m$^2$/g, an average pore size of 6.2 nm, and a pore volume of 0.23 cm$^3$/g. Ammonium metavanadate as the vanadium-containing precursor and oxalic acid as the cosolvent at a molar ratio of 1:2 were dissolved in deionized water to formulate an impregnating solution (that is, vanadium-containing precursor solution) having a concentration of 0.2 M; the impregnating solution was added to a powder of titanium oxide containing the crystal form $TiO_2(B)$ at a liquid-solid ratio of 0.7 mL/g (that is, 1 mL impregnating solution was mixed with 0.7 g titanium oxide all in the crystal form $TiO_2(B)$), fully stirred, stood still for 8 h, and dried in an oven, and then placed in a tube furnace and calcinated at 500° C. with air charged, to obtain a vanadium-titanium compound material.

Test of thermal stability of the vanadium-titanium compound material: the vanadium-titanium compound material was placed in a muffle furnace, and calcinated for 2 h at six temperatures, 500° C., 600° C., 700° C., 800° C., 900° C. and 1000° C. respectively.

Figure 1:
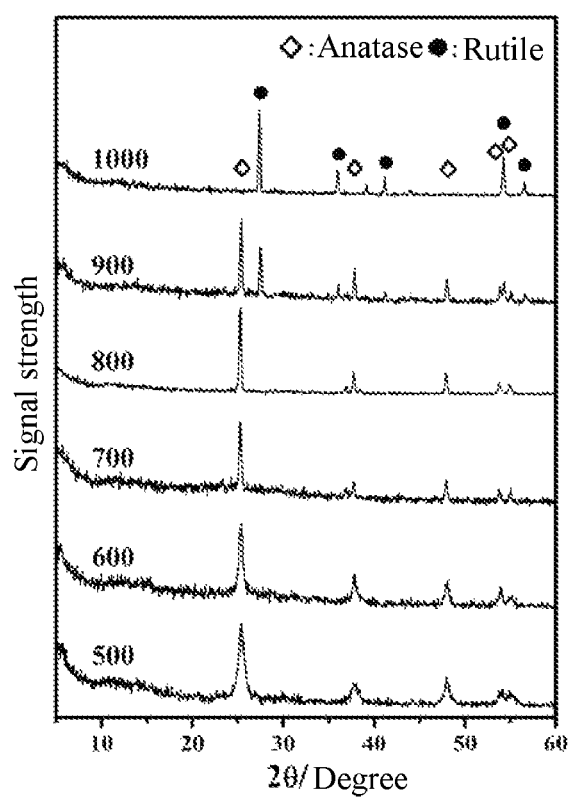
FIG. 1 is an XRD pattern of a vanadium-titanium compound material according to Embodiment 1 after the thermal stability test.

Method 1: After cooling, the 6 samples were porphyrized, and the crystal forms of the samples were detected by a X-ray powder diffraction (XRD) meter of model D8Adavance, where the detection conditions were the scanning range of 5° to 60°, the speed of 0.5 s/step, and the voltage of 40 kV and the current of 30 mA. The experimental results were shown in FIG. 1.

Figure 2:
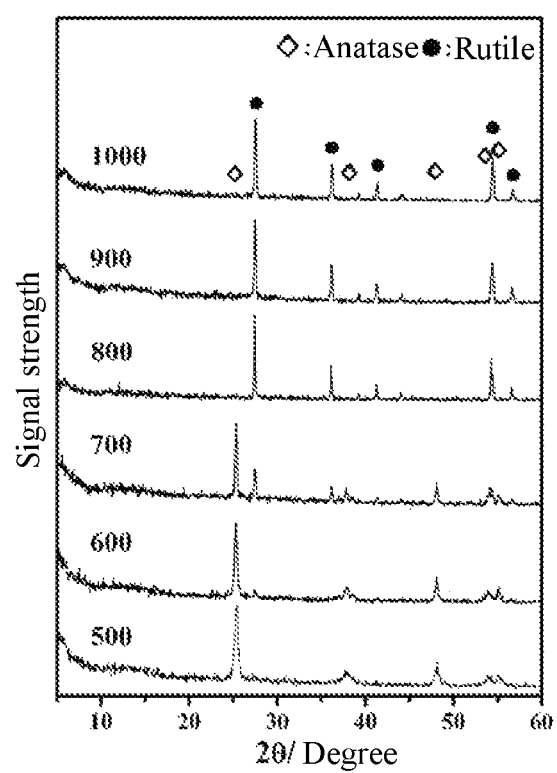
FIG. 2 is an XRD pattern of a vanadium-titanium compound material obtained by a conventional method after the thermal stability test.
Figure 3:
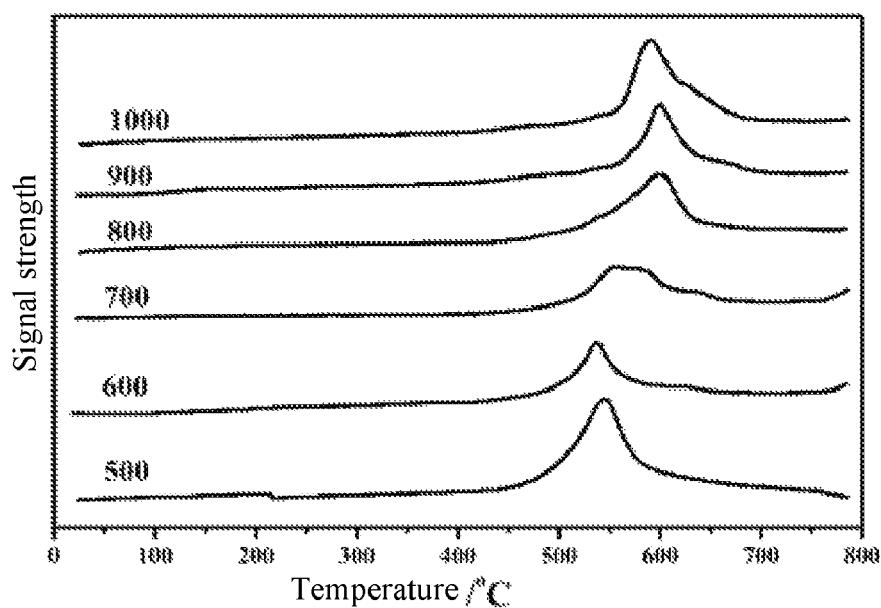
FIG. 3 is a TPR pattern of the vanadium-titanium compound material according to Embodiment 1 after the thermal stability test.
Figure 4:
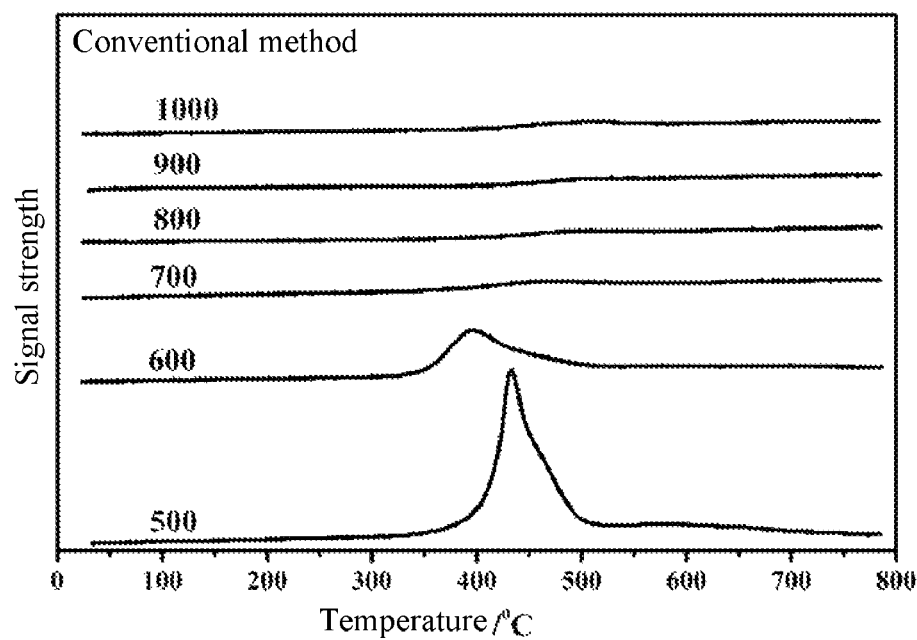
FIG. 4 is a TPR pattern of a vanadium-titanium compound material obtained by a conventional method after the thermal stability test.

Method 2: After cooling, the 6 samples were porphyrized, and the reducing capacity of vanadium oxide in the sample was detected by a multifunctional adsorption instrument (TPR) of model TP-5000. 0.05 g sample was weighted and added into a quartz tube, air was charged into the quartz tube at a speed of 20 mL/min, and the temperature was raised from room temperature to 300° C. at a rate of 10° C./min and maintained at 300° C. for 0.5 h; after the temperature was decreased to room temperature, a 20% hydrogen/nitrogen mixture was charged at a speed of 20 mL/min, a thermal conductivity detector was turned on, the bridge current was set to be 90 mA, and the thermal conductivity cell temperature was 60° C.; after the detector was stable, the temperature was raised from room temperature to 800° C. at a rate of 10° C./min, and singles were acquired by the thermal conductivity detector. The experimental results were shown in FIG. 2.

Test of oxynitride removal performance of the vanadium-titanium compound material: the evaluation device was a quartz tube reactor having a inner diameter of 8 mm; the vanadium-titanium compound material was tabletted and crushed into particles having a particle size of 1.25 to 3 mm, and the particles were placed in the thermostat section of the reactor to an accumulation length of about 18 cm; the composition of the feed gas was: NO (700 ppm), $NH_3$ (700 ppm), 5% $O_2$, with the rest being nitrogen; the space velocity was 5000 $h^{-1}$, and the reaction temperature was 300° C.

Test of volatile organic compound removal performance of the vanadium-titanium compound material: this evaluation was performed in a fixed-bed microreactor having an inner diameter of 4 mm; a certain amount of vanadium-titanium compound material was weighted and added to the thermostat section of the reactor; the volatile organic compound was toluene, the content of toluene in the feed gas was 1000 ppm, and the rest being air; the reaction temperature was 400° C., and the space velocity of the feed gas was 12000 $h^{-1}$.

The structural parameters and the evaluation results of the catalytic performance of the vanadium-titanium compound material were shown in Table 1.

Embodiment 2:

Anatase type TiO2, industrial grade $K_2CO_3$ (purity 98 wt %), and $H_2O$ were fully mixed, where the $TiO_2/K_2O$ molar ratio was 3, and the water content was 20 wt %; the mixed reactants were uniformly coated on an alumina plate and sintered at a reaction temperature of 1000° C. for a reaction time of 2 h, and the sintered product was potassium tetratitanate; the sintered product was crushed and placed in an HCl aqueous solution at pH 3 and stirred for 24 h to the potassium content in solid of less than 0.5 wt % of the product; the resulting product was washed with water, filtered, and dried for 12 h at 20° C. to 50° C., to obtain a hydrated product; the resulting product was crystallized for 2 h in the air at 400° C., to obtain titanium oxide all in the crystal form $TiO_2(B)$ having a specific surface area of 20 $m^2/g$ and a pore volume of 0.03 $cm^3/g$. As the vanadium-containing precursor, vanadyl sulfate was dissolved in deionized water to formulate an impregnating solution having concentration of 1 mol/L; the impregnating solution was added to titanium oxide all in the crystal form $TiO_2(B)$ at a liquid-solid ratio of 0.7 g/mL (that is, 1 mL impregnating solution was mixed with 0.7 g titanium oxide all in the crystal form $TiO_2(B)$), and fully stirred, stood still for 8 h, dried in an oven, and then placed in a tube furnace and calcinated at 600° C. with air charged, to obtain a vanadium-titanium compound material.

The structural parameters and the evaluation results of the catalytic performance of the vanadium-titanium compound material were shown in Table 1.

Embodiment 3:

Anatase type titanium oxide was dispersed in a 10 M NaOH aqueous solution at a liquid-solid ratio of 100 mL/g, and then the mixed solution was fully stirred, placed in a hydrothermal reactor and heated to 180° C., and maintained at 180° C. for 48 h. After the solution was cooled to room temperature, the precipitate was collected and immersed in excessive amount of 0.1 M HCl aqueous solution, stirred for 24 h; then, the precipitate was washed with deionized water, collected, and dried at 80° C. The powder was calcinated for 2 h at 400° C., to obtain a powder of titanium oxide all in the crystal form $TiO_2(B)$, where titanium oxide in the crystal form $TiO_2(B)$ has a specific surface area of 50 $m^2/g$, a pore volume of 0.15 $cm^3/g$, and an average pore size of 12 nm. As the vanadium-containing precursor, vanadyl oxalate was dissolved in deionized water to formulate an impregnating solution having concentration of 0.6 mol/L; the impregnating solution was added to titanium oxide at the liquid-solid ratio as described in Embodiment 1, and fully stirred, stood still for 8 h, dried in an oven, and then placed in a tube furnace and calcinated at 400° C. with air charged, to obtain a vanadium-titanium compound material.

The structural parameters and the evaluation results of the catalytic performance of the vanadium-titanium compound material were shown in Table 1.

Embodiment 4:

Twin titanium oxide containing the crystal form $TiO_2(B)$ and the crystal form anatase prepared according to the method of Embodiment 1 was compounded with commercially available anatase type titanium oxide (commercially available anatase titanium oxide had a specific surface area of 200 $m^2/g$, a pore volume of 0.35 $cm^3/g$, and an average pore size of 5 nm) at a mass ratio of 1:1, to obtain twin titanium oxide containing the crystal form $TiO_2(B)$ and the crystal form anatase, where the content of the $TiO_2(B)$ crystal form was about 2.5%. As the vanadium-containing precursor, ammonium metavanadate was added into absolute ethanol, heated and stirred, to formulate an impregnating solution having a concentration of 0.1 mol/L; the impregnating solution was added to titanium oxide at a liquid-solid ratio of 0.7 mL/g, fully stirred, stood still for 8 h, and dried in an oven; and then, placed in a tube furnace, and calcinated at 700° C. with air charged, to obtain a vanadium-titanium compound material.

The structural parameters and the evaluation results of the catalytic performance of the vanadium-titanium compound material were shown in Table 1.

Embodiment 5:

Titanium oxide all in the crystal form $TiO_2(B)$ prepared according to the method of Embodiment 2 was compounded with commercially available anatase type titanium oxide (the same as that in Embodiment 4) at a mass ratio of 1:5, to obtain twin titanium oxide containing the crystal form $TiO_2(B)$ and the crystal form anatase, where the content of the crystal form $TiO_2(B)$ was about 16%. Ammonium metavanadate as the vanadium-containing precursor and oxalic acid as the cosolvent at a molar ratio of 1:2 were dissolved in deionized water to formulate an impregnating solution having a concentration of 3 mol/L; the impregnating solution was added to titanium oxide having a content of the crystal form $TiO_2(B)$ of about 16% at a liquid-solid ratio of 0.7 mL/g, fully stirred, stood still for 8 h, and dried in an oven, and then placed in a tube furnace and calcinated at 500° C. with air charged, to obtain a vanadium-titanium compound material.

The structural parameters and the evaluation results of the catalytic performance of the vanadium-titanium compound material were shown in Table 1.

Embodiment 6:

Titanium oxide all in the crystal form $TiO_2(B)$ prepared according to the method of Embodiment 3 was compounded with commercially available anatase type titanium oxide (the same as that in Embodiment 4) at a mass ratio of 1:10, to obtain twin titanium oxide containing the crystal form $TiO_2(B)$ and the crystal form anatase, where the content of the $TiO_2(B)$ crystal form was 10%. As the vanadium-containing precursor, vanadyl sulfate was dissolved in deionized water to formulate an impregnating solution having a concentration of 2 mol/L; the impregnating solution was added to titanium oxide having a content of the crystal form of $TiO_2(B)$ of 10% at a liquid-solid ratio of 0.7 mL/g, fully stirred, stood still for 8 h, and dried in an oven; and then, placed in a tube furnace, and calcinated at 400° C. with air charged, to obtain a vanadium-titanium compound material.

The structural parameters and the evaluation results of the catalytic performance of the vanadium-titanium compound material were shown in Table 1.

Embodiment 7:

Twin titanium oxide containing the crystal form $TiO_2(B)$ and the crystal form anatase prepared according to the method of Embodiment 1 was compounded with commercially available amorphous hydrated titanium oxide at a mass ratio of 1:8, and calcinated for 2 h at 500° C., to obtain twin titanium oxide containing the crystal form $TiO_2(B)$ and the crystal form anatase having a content of the crystal form $TiO_2(B)$ of about 1%, where the material had a specific surface area of 150 m²/g, a pore volume of 0.35 cm³/g, and a pore diameter of 8 nm. As the vanadium-containing precursor, vanadyl sulfate was dissolved in deionized water to formulate an impregnating solution having a concentration of 6 mol/L; the impregnating solution was added to titanium oxide having a content of the crystal form $TiO_2(B)$ of about 1% at a liquid-solid ratio of 1 mL/g, fully stirred, stood still for 8 h, and dried in an oven; and then, placed in a tube furnace, and calcinated at 550° C. with air charged, to obtain a vanadium-titanium compound material.

Embodiment 8:

Tetrabutyl titanate and acetylacetone were slowly added to absolute ethanol at the same time, and stirred for 1 h at room temperature; an ethanol-hydrochloric acid aqueous solution was formulated, and added to the solution of tetrabutyl titanate and acetylacetoneethanol with vigorous stirring at a speed of 1 to 2 drops per second, and continuously stirred for 4 h, to obtain a stable transparent sol solution, where the molar ratio of the materials was Ti:absolute ethanol:water:acetylacetone=1:20:5:0.3; and after the sample was gelated, and then aged for 2 days at room temperature, to form a sol.

Titanium oxide all in the crystal form $TiO_2(B)$ prepared according to the method of Embodiment 2 was added to the sol at a mass ratio of 1:20, stirred for 6 h, dried in an oven, and calcinated for 2 h at 400° C., to obtain titanium oxide all in the crystal form $TiO_2(B)$. As the vanadium-containing precursor, ammonium metavanadate was dissolved in deionized water to formulate an impregnating solution having a concentration of 4 mol/L; the impregnating solution was added to titanium oxide at the liquid-solid ratio of 0.5 mL/g, fully stirred, stood still for 8 h, and dried in an oven, and then placed in a tube furnace and calcinated at 300° C. with air charged, to obtain a vanadium-titanium compound material.

TABLE 2

Structural parameters and the evaluation results of the catalytic performance of the vanadium-titanium compound material

| Embodiment | Mass percentage of vanadium oxide | Structural parameters | | | | Crystal transformation temperature | Conversion rate of oxynitride | Conversion rate of volatile organic compound |
|---|---|---|---|---|---|---|---|---|
| | | Specific surface area m²/g | Pore volume cm³/g | Average pore size nm | Crystal form composition | | | |
| Embodiment 1 | 1 wt % | 98 | 0.23 | 6 | anatase | 900° C. | 98% | 97% |
| Embodiment 2 | 5 wt % | 8 | 0.02 | / | $TiO_2(B)$ + anatase | 850° C. | 99% | 100% |
| Embodiment 3 | 3 wt % | 42 | 0.13 | 10.5 | $TiO_2(B)$ | 820° C. | 99% | 99% |
| Embodiment 4 | 0.5 wt % | 1 | 0.01 | / | anatase | 850° C. | 85% | 88% |
| Embodiment 5 | 10 wt % | 120 | 0.32 | 6.3 | anatase | 800° C. | 98% | 98% |
| Embodiment 6 | 15 wt % | 150 | 0.28 | 5.2 | $TiO_2(B)$ + anatase | 700° C. | 98% | 100% |
| Embodiment 7 | 30 wt % | 50 | 0.18 | 8.5 | $TiO_2(B)$ + anatase | 730° C. | 100% | 100% |
| Embodiment 8 | 20 wt % | 200 | 0.45 | 5.5 | anatase | 780° C. | 96% | 100% |

COMPARATIVE EXAMPLE 1

As the raw material, hydrated titanium oxide (Jiangsu Zhenjiang Titanium Dioxide Co., Ltd.) was calcinated for 2 h at 500° C., to obtain anatase type titanium oxide having a specific surface area of 150 m²/g, a pore volume of 0.3 cm³/g, and an average pore size of 6.5 nm. The resulting anatase type titanium oxide was used as the base material of a vanadium-titanium compound material, the method for preparing the vanadium-titanium compound material was the same as that in Embodiment 1. According to the material structure and performance evaluation method in Embodiment 1, it is known from tests that, the material has rutile phase after heat treatment at 600° C., and the removal rate of oxynitride is 60%.

COMPARATIVE EXAMPLE 2

Titanium oxide was prepared according to the precipitation method reported in reference[7]. 20 mL tetrabutyl titanate was added to 100 mL absolute ethanol, the mixed solution was then added to 100 mL ethanol aqueous solution, and the mixed solution was stirred, where the molar ratio of water/tetrabutyl titanate was 75. After a while precipitate was formed, the mixed solution was continuously stirred for 24 h, and the precipitate was then collected and washed with 400 mL ethanol aqueous solution. After washing, the precipitate was baked for 24 h in an oven at 80° C., and finally the dried powder was subjected to heat treatment for 2 h at 400° C., to obtain titanium oxide all in the crystal form anatase, where the material had a specific surface area of 130 m$^2$/g, a pore volume of 0.25 cm$^3$/g, and an average pore size of 7 nm. According to the material structure and performance evaluation method in Embodiment 1, it is known from tests that, the material has rutile phase after heat treatment at 500° C., and the removal rate of oxynitride is 60%.

COMPARATIVE EXAMPLE 3

Commercial titanium oxide nanoparticles (Hangzhou Wanjing New Material Co., Ltd.) had a specific surface area of 88.3 m$^2$/g, a pore volume of 0.05 cm$^3$/g, and a particle size of 10 nm. According to the material structure and performance evaluation method in Embodiment 1, it is known from tests that, the material has rutile phase after heat treatment at 550° C., and the removal rate of oxynitride is 68%.

COMPARATIVE EXAMPLE 4

In the vanadium-titanium compound material reported in reference[8], the crystal form of titanium oxide was anatase, 9 wt % tungsten trioxide was added to the compound as the structure auxiliary agent to improve the thermal stability of the vanadium-titanium compound material. The rutile generation temperature of the compound was 600° C., and the conversion rate of oxynitride was 95%.

COMPARATIVE EXAMPLE 5

According to the improved method reported in reference[9], silica having a content of 5 wt % was added as the structure auxiliary agent to improve the thermal stability of the vanadium-titanium compound material. The rutile generation temperature of the compound was 730° C., the conversion rate of oxynitride was merely 30%, and the removal rate of the volatile organic compound was 45%.

What is claimed is:

1. A method for preparing a vanadium-titanium compound material, comprising:
   adding titanium oxide containing the crystal form TiO$_2$(B) to a vanadium-containing precursor solution, fully stirring, standing still for 6 to 8 h, drying, and then roasting at 300° C. to 700° C.; wherein
   the vanadium-containing precursor solution is prepared from a vanadium-containing precursor, the vanadium-containing precursor including metavanadate, vanadyl sulfate or vanadyl oxalate.

2. The method for preparing a vanadium-titanium compound material according to claim 1, wherein a content of the crystal form TiO$_2$(B) in the titanium oxide containing the crystal form TiO$_2$(B) is 1% to 100%.

3. The method for preparing a vanadium-titanium compound material according to claim 2, wherein the content of the crystal form TiO$_2$(B) in the titanium oxide having the crystal form TiO$_2$(B) is 5% to 100%.

4. The method for preparing a vanadium-titanium compound material according to claim 1, wherein the titanium oxide containing the crystal form TiO$_2$(B) has a specific surface area of 10 to 300 m$^2$/g, a pore volume of 0.02 to 1.0 cm$^3$/g, and an average pore size of 1.0 to 50 nm.

5. The method for preparing a vanadium-titanium compound material according to claim 1, wherein
   the vanadium-containing precursor solution is prepared by mixing the vanadium-containing precursor with water or an organic alcohol.

6. The method for preparing a vanadium-titanium compound material according to claim 5, wherein the organic alcohol is ethanol.

7. The method for preparing a vanadium-titanium compound material according to claim 1, wherein a concentration of the vanadium-containing precursor in the vanadium-containing precursor solution is 1 to 6 mol/L.

8. The method for preparing a vanadium-titanium compound material according to claim 1, wherein a liquid-solid ratio of the vanadium-containing precursor solution to the titanium oxide containing the crystal form TiO$_2$(B) is 0.5 to 1.0 mL/g.

9. A method for preparing a vanadium-titanium compound material, comprising:
   preparing a vanadium-containing precursor solution by mixing a vanadium-containing precursor and a solvent, wherein
   the vanadium-containing precursor is metavanadate, vanadyl sulfate or vanadyl oxalate, and
   the solvent is water or an organic alcohol;
   adding titanium oxide containing the crystal form TiO$_2$(B) to the vanadium-containing precursor solution;
   stirring the vanadium-containing precursor solution to which the titanium oxide containing the crystal form TiO$_2$(B) has been added to form a mixture;
   allowing the mixture to stand for 6 to 8h and then drying the mixture to form a dried mixture; and
   calcinating the dried mixture at 300° C. to 700° C. to obtain the vanadium-titanium compound material.

10. The method for preparing a vanadium-titanium compound material according to claim 9, wherein a content of the crystal form TiO$_2$(B) in the titanium oxide containing the crystal form TiO$_2$(B) is 1% to 100%.

11. The method for preparing a vanadium-titanium compound material according to claim 10, wherein the content of the crystal form TiO$_2$(B) in the titanium oxide having the crystal form TiO$_2$(B) is 5% to 100%.

12. The method for preparing a vanadium-titanium compound material according to claim 9, wherein the titanium oxide containing the crystal form TiO$_2$(B) has a specific surface area of 10 to 300 m$^2$/g, a pore volume of 0.02 to 1.0 cm$^3$/g, and an average pore size of 1.0 to 50 nm.

13. The method for preparing a vanadium-titanium compound material according to claim 9, wherein the organic alcohol is ethanol.

14. The method for preparing a vanadium-titanium compound material according to claim 9, wherein a concentration of the vanadium-containing precursor in the vanadium-containing precursor solution is 1 to 6 mol/L.

15. The method for preparing a vanadium-titanium compound material according to claim 9, wherein a liquid-solid ratio of the vanadium-containing precursor solution to the titanium oxide containing the crystal form $TiO_2(B)$ is 0.5 to 1.0 mL/g.

* * * * *